United States Patent

Semba

[11] Patent Number: 5,931,680
[45] Date of Patent: Aug. 3, 1999

[54] SCORE INFORMATION DISPLAY APPARATUS

[75] Inventor: Youji Semba, Hamamatsu, Japan

[73] Assignee: Yamaha Corporation, Hamamatsu, Japan

[21] Appl. No.: 08/635,107

[22] Filed: Apr. 19, 1996

[30] Foreign Application Priority Data

Apr. 21, 1995 [JP] Japan ................................. 7-096748

[51] Int. Cl.[6] .............................. G09B 15/02; G10H 1/36; H04N 5/78
[52] U.S. Cl. .................... 434/307 A; 434/318; 84/610; 84/477 R
[58] Field of Search .................... 434/307 R–309, 434/318, 365; 84/454, 477 R, 601–615, 625, 645; 348/478, 484, 571, 595, 738; 360/32, 33.1, 77.01; 369/32, 48, 50; 345/87, 121, 327, 473

[56] References Cited

U.S. PATENT DOCUMENTS 5,208,413  5/1993  Tsumura et al. .................. 434/307 A
5,287,789  2/1994  Zimmerman ........................ 84/477 R
5,410,097  4/1995  Kato et al. ............................ 84/610
5,464,946  11/1995  Lewis .................................. 84/609
5,488,196  1/1996  Zimmerman et al. ............. 84/612
5,499,921  3/1996  Sone ................................ 434/307 A
5,525,062  6/1996  Ogawa et al. ................... 434/307 A
5,563,358  10/1996  Zimmerman ...................... 84/477 R
5,621,182  4/1997  Matsumoto ......................... 84/610
5,726,373  3/1998  Choi et al. ........................... 84/609

Primary Examiner—Joe H. Cheng
Attorney, Agent, or Firm—Pillsbury Madison & Sutro LLP

[57] ABSTRACT

A score display apparatus shows beat marks in a number corresponding to the number of beats per measure during a performance by a musical instrument karaoke apparatus. Further, the score display apparatus changes the color of each of beat marks as though the beat mark is wiped with a different color in a predetermined direction in synchronism with the tempo of a performance of the musical instrument karaoke apparatus, and changes the color of the displayed beat marks in synchronism with the timing of the beats.

18 Claims, 5 Drawing Sheets

SCORE INFORMATION DISPLAY APPARATUS

BACKGROUND OF THE INVENTION

1. Field of the Invention

The present invention relates to a score information display apparatus suitable for a musical instrument karaoke apparatus, and in particular embodiments to a display apparatus for displaying score information.

2. Description of Related Art

In a typical karaoke apparatus, lyrics of a song are displayed along with an accompaniment (e.g., a song) performed by the karaoke apparatus. Such a karaoke apparatus is capable of displaying the lyrics on a monitor and changing colors of the displayed characters of the lyrics in synchronism with the progress of the song. For those who either do not clearly remember the lyrics of the song or are not used to singing, this type of karaoke apparatus is helpful because these people can sing the song along with the accompaniment by keeping pace with the changing colors of the characters of the lyrics displayed on the monitor.

In recent years, a variety of musical instrument karaoke apparatuses have been proposed. A typical musical instrument karaoke apparatus can perform an accompaniment for a user so that the user can play a musical instrument as well as sing a song. However, none of the typical musical instrument karaoke apparatuses displays information on a monitor that allows a player to readily keep pace with the tempo of the accompaniment. Therefore, it is difficult for a beginner player, who is not used to playing the musical instrument, to make effective use of the musical instrument karaoke apparatus.

SUMMARY OF THE INVENTION

It is an object of embodiments of the present invention to provide a score information display apparatus that can be effectively utilized by a beginner player who is not used to playing a musical instrument.

In accordance with an embodiment of the present invention, a score information display apparatus displays data to assist a user in playing a musical instrument in synchronism with an accompaniment performance of a musical instrument karaoke apparatus. The score information display apparatus includes a memory device that stores music character data including data for beat marks that represent beats of a piece of music. A reading device is provided to read out the music character data from the memory device in synchronism with a tempo of the accompaniment performance of the musical instrument karaoke apparatus. A display device displays the beat marks in a number corresponding to the number of the beats per a specified unit range of the piece of music based on the music character data read out by the reading device, and a color change control device successively changes the color of the beat marks displayed by the display device in synchronism with a timing of the beats of the piece of music. As a result, the user can watch the beat marks whose colors are changed in synchronism with the tempo of the performance or the timing of the beats, and then the user keeps her own performance in pace with a tempo of the accompaniment performance or a timing of the beats played by the musical instrument karaoke apparatus.

In accordance with another embodiment of the present invention, a score information display apparatus displays performance data to assist a user in playing a musical instrument in synchronism with an accompaniment performance of a musical instrument karaoke apparatus. The score information display apparatus includes a first memory device that stores first music character data corresponding to beat marks representative of beats of a piece of music, and a second memory device that stores second music character data corresponding to musical marks for designating a method of performing the piece of music. The score information display apparatus includes a reading device and a display device. The reading device reads out at least one of the first music character data from the first memory in synchronism with a tempo of the accompaniment performance of the musical instrument karaoke apparatus. The display device operates so that the beat marks are displayed on a display monitor in a number corresponding to the number of beats in a unit of a measure of the musical piece based on the first musical character data read out by the reading device. A color change control device successively changes the colors of the beat marks displayed on the display monitor by the display device in synchronism with a timing of the beats. The reading device also reads out at least one of the second music character data from the second memory at a specified timing corresponding to the accompaniment performance of the musical instrument karaoke apparatus. The display device operates so that the at least one of the second music character data is displayed on the display monitor for a predetermined duration of time based on the second character data.

In addition to displaying the beat marks and changing the color of the beat marks, the score information display apparatus displays marks for designating a method of performing a piece of music, such as for example, dynamic marks, in synchronism with the timing of the performance of the piece of music. As a result, a player can find a relevant portion of the score of the piece of music at a glance without having to read through the score to look for the relevant portions of the score.

In accordance with still another embodiment of the present invention, the color change control device changes the color of each of the beat marks in synchronism with the timing of the beats and in a specified period of time. As a result, a player can see and thus depend on the color of the beat marks to measure the timing of each of the beats. Accordingly, it is easier for the player to keep pace with the timing of each of the beats.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings.

DETAILED DESCRIPTION OF EMBODIMENTS

An embodiment of the present invention will be described with reference to the accompanying drawings. The preferred embodiment will be described with reference to a hand-carry type musical instrument karaoke apparatus. However, it should be understood that embodiments of the present invention may also be used with non-hand-carry type musical instrument karaoke instruments.

Figure 2:
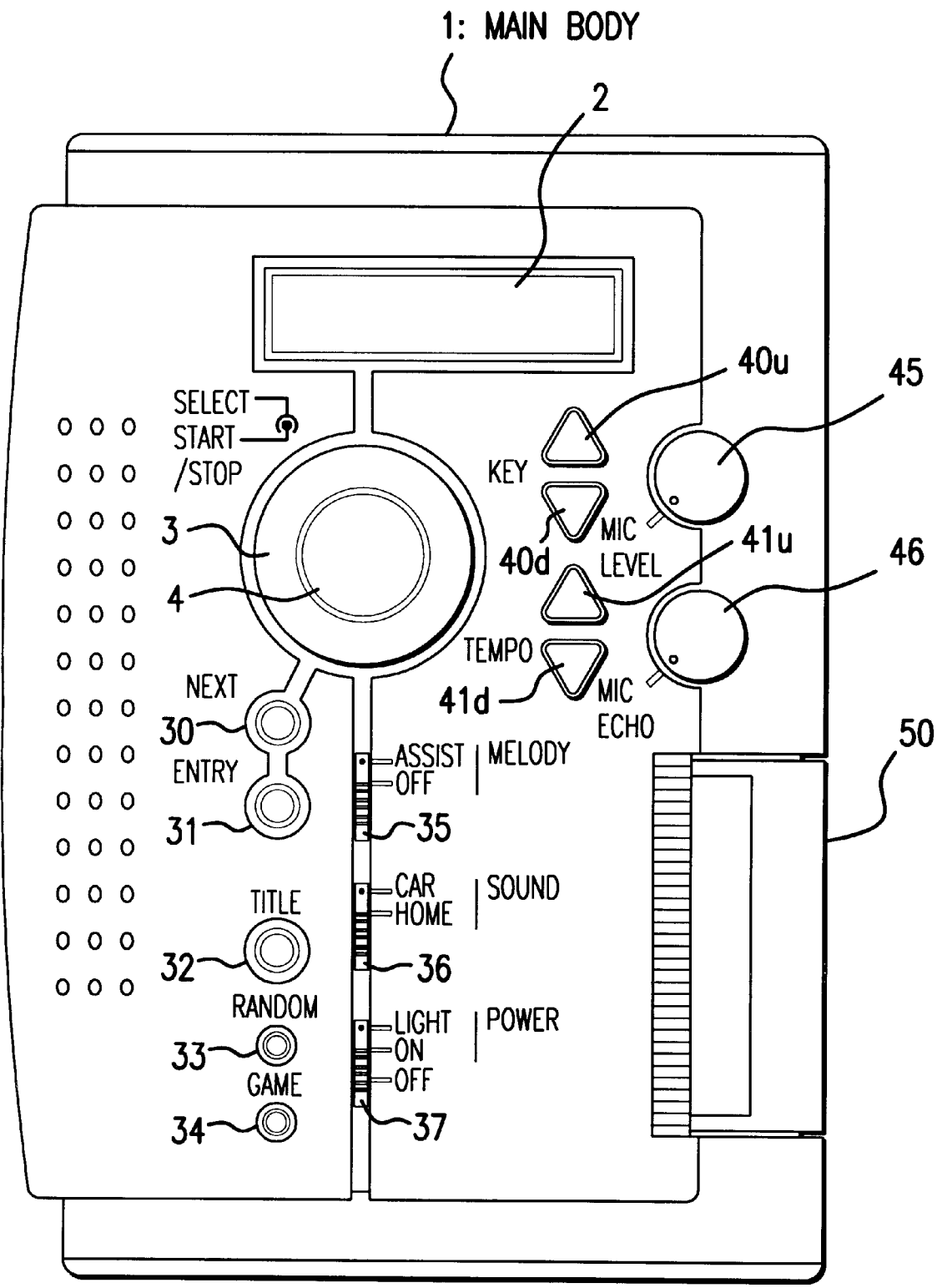
FIG. 2 shows a front view of an exterior of the musical score display apparatus in accordance with an embodiment of the present invention.

FIG. 2 shows a front view of an external appearance of a hand-carry type musical instrument karaoke apparatus in accordance with an embodiment of the present invention. In FIG. 2, reference numeral 1 denotes a body 1 of the hand-carry type musical instrument karaoke apparatus. The body 1 is provided with operation buttons and a display device on its front face which will be described later.

In a front upper portion of the apparatus body 1, a liquid crystal display 2 is provided for displaying a variety of information, and a selection knob 3 for song selection and a start/stop button 4 for designating a start or a stop of a karaoke performance are located under the liquid crystal display 2.

A ROM cartridge 50 is detachably mounted on the apparatus body 1. The ROM cartridge 50 includes an internally mounted ROM that stores performance data for pieces of music (for example, 18 pieces of music stored in MIDI data), data for titles of pieces of music, and data for the musical score. The ROM cartridge 50 stores data for specific titles. Each of the titles can be displayed on a display device, such as a liquid crystal display device, a TV monitor and the like. The contents stored in the ROM cartridge 50 will be described in detail later.

A next button 30 is operated for skipping a scheduled piece of music and calling up a scheduled piece of music which was to be played after the skipped piece of music. An entry button 31 is operated for confirming the schedule for a piece of music. A random button 33 is operated for designating a random selection mode in which pieces of music are randomly selected for performance. When the random selection mode is set, the pieces of music stored in the ROM cartridge 50 are randomly designated. A game button 34 is used for designating a game mode. In the game mode, games can be played. For example, in one of the games, players guess the title of a piece of music while the piece of music is played at a higher speed or at a lower speed.

A melody switch 35 is operated to designate turning on or off a melody part of a piece of music that is performed. When a user does not clearly remember the melody part of the musical piece, the melody switch 35 is turned on to output the melody part for assisting the user in playing the melody part of the musical piece. On the other hand, if a user knows the melody part, the melody switch 35 may be turned off.

A sound switch 36 is a switch for changing reverberations and sound qualities determined by filter characteristics. In accordance with an embodiment of the present invention, the sound switch 36 allows the user to select one of two sound qualities to be applied to two environments, that is, the interior of an automobile and the interior of a room. However, in alternative embodiments, more than two sound qualities may be provided to be adapted for more than two environments.

A power switch 37 is a three-contact type switch that has three switch positions, namely, "Power Off", "Power On" and "Power On+Back Light of the liquid crystal display ON".

Reference numerals 40u and 40d denote key switches for changing the pitch of each of the musical pieces. When the key switch 40u is depressed, the pitch goes up, and when the key switch 40d is depressed, the pitch goes down. Reference numerals 41u and 41d denote tempo switches for changing the tempo of each of the pieces of music. When the tempo switch 41u is depressed, the tempo becomes faster, and when the tempo switch 41d is depressed, the tempo becomes slower. Reference numeral 45 denotes a microphone loudness controller for controlling the loudness of a microphone, and reference numeral 46 denotes an echo controller for controlling the degree of an echo effect that is added to a signal received from the microphone.

Figure 3:
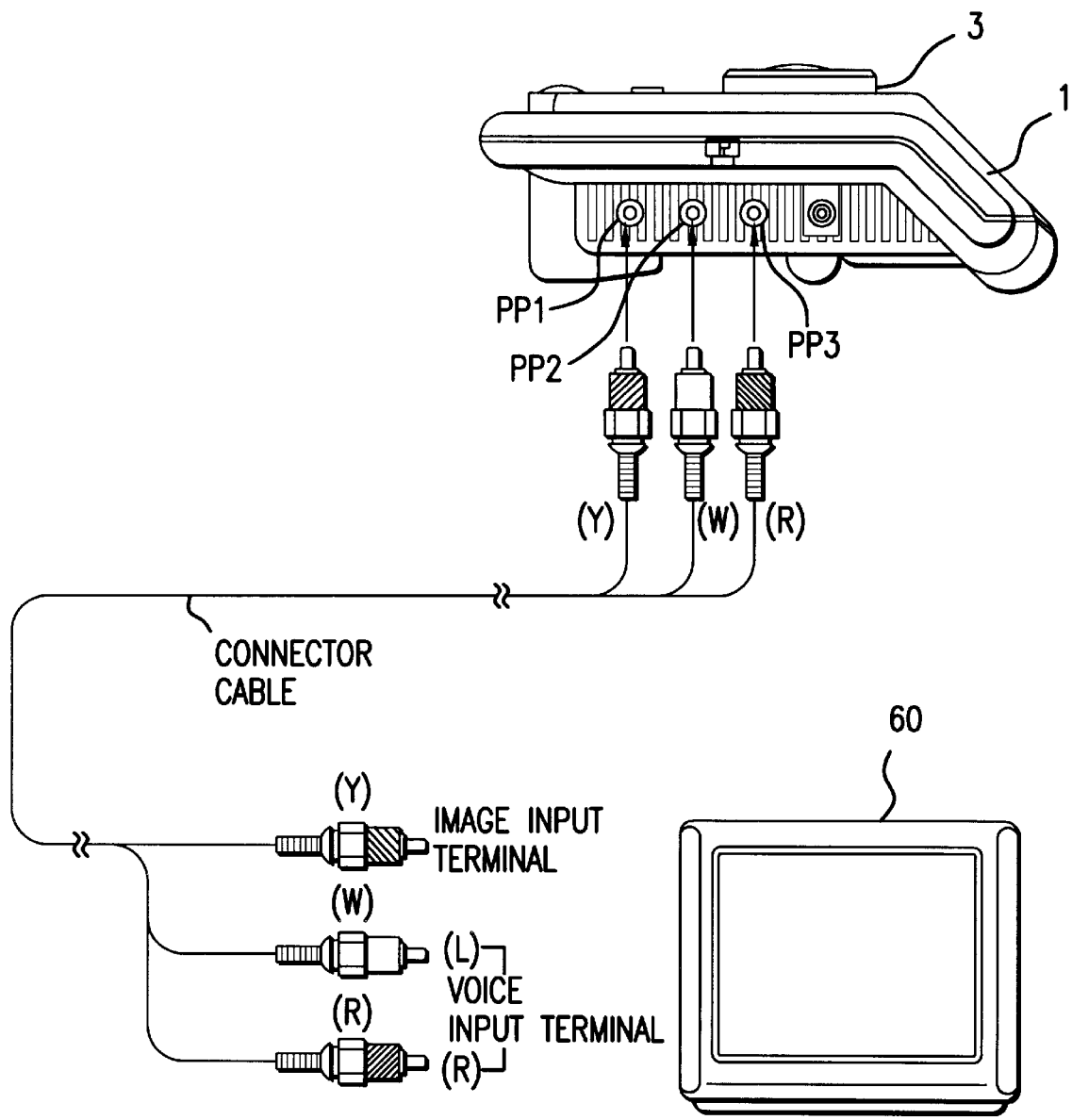
FIG. 3 shows a connection between a TV apparatus and the musical score display apparatus shown in FIG. 1.

Reference numerals PP1, PP2 and PP3 shown in FIG. 3 denote external output terminals. Reference numeral PP1 denotes an image output terminal, reference numerals PP2 and PP3 respectively denote sound output terminals (left and right audio signal output terminals). The terminals PP1, PP2 and PP3 are connected to video input terminals of a TV set 60 through connector cables.

Figure 1:
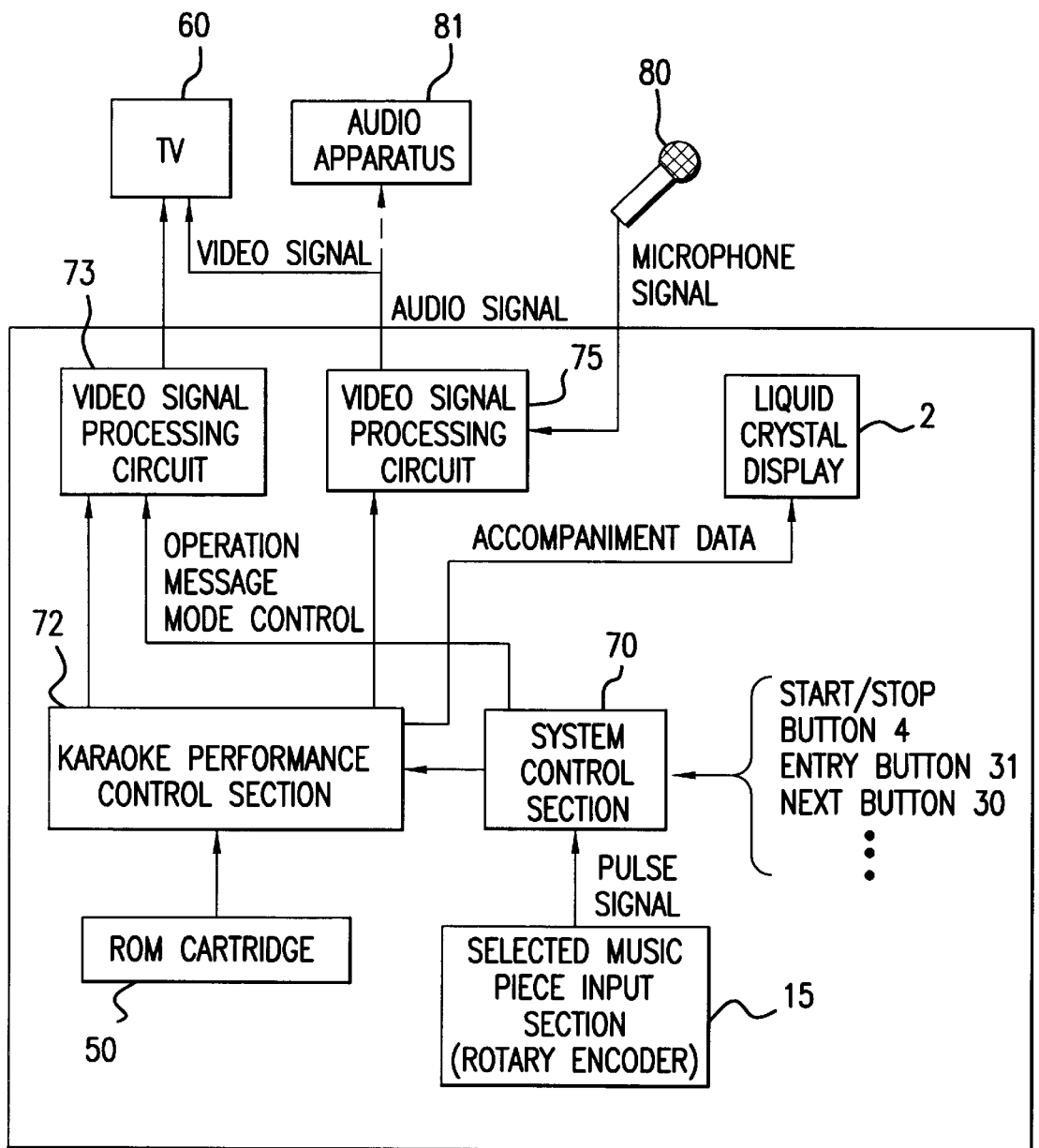
FIG. 1 shows a block diagram of an electrical structure of a musical score display apparatus in accordance with an embodiment of the present invention.

FIG. 1 shows a block diagram of an electrical structure of a score display apparatus in accordance with an embodiment of the present invention. Reference numeral 70 denotes a system control section that controls various other sections of the apparatus. The system control section 70 generates signals required to operate various sections of the score display apparatus in response to the operation of the buttons and switches provided on the apparatus body 1 shown in FIG. 2. The system control section 70 controls a karaoke performance control section 72 and a video signal processing circuit 73 based on a pulse signal outputted from a piece of music selection input section 15.

The karaoke performance control section 72 reads out data for a title of a piece of music and a musical score of the piece of music from the ROM cartridge 50 that is inserted in the apparatus body 1. The karaoke performance control section 72 forms image data based on the data read out from the ROM cartridge 50, and outputs the image data to the video signal processing circuit 73. The karaoke performance control section 72 also controls a sound source section (not shown) to provide a synthesized sound signal based on performance data of a selected piece of music that is read out from the ROM cartridge 50. The karaoke performance control section 72 then outputs the synthesized sound signal to an audio signal processing circuit 75. The audio signal processing circuit 75 mixes a voice signal inputted from a microphone 80 and the synthesized sound signal supplied from the karaoke performance control section 72 to provide an audio signal. The audio signal processing circuit 75 then amplifies and outputs the audio signal. The signals outputted from the video signal processing circuit 73 and the audio signal processing circuit 75 are respectively supplied to the TV set (see FIG. 3). It is noted that the output signal from the audio signal processing circuit 75 may be supplied to a separate audio apparatus 81.

Figure 4:
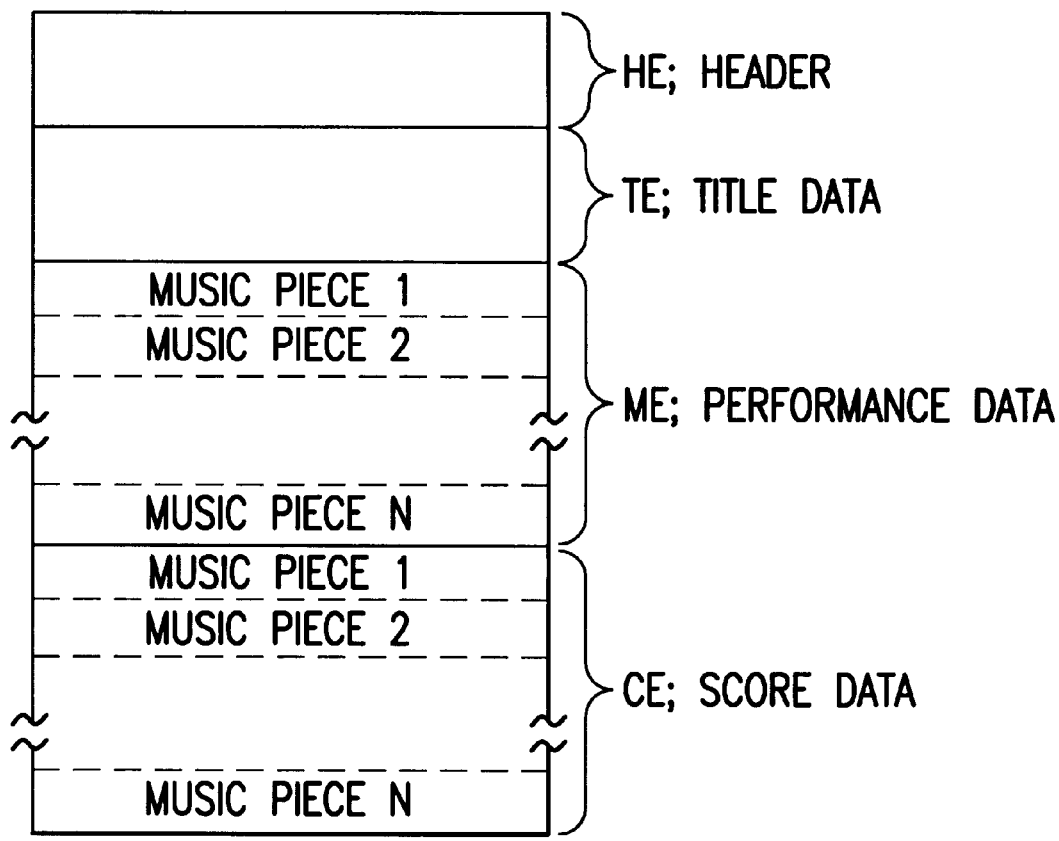
FIG. 4 shows a memory map of a ROM cartridge that is used in the musical score display apparatus as shown in FIG. 1.

FIG. 4 shows a memory map of the ROM cartridge 50. The memory map of the ROM cartridge 50 is composed, for example, of a header region HE, a title information region TE, a performance data region ME and a score data region CE.

The header region HE stores various management data such as data regarding a memory size and the number of stored pieces of music, title data for titles of the pieces of music, and data representing head address locations of performance data and score data. The title data region TE stores code data representative of the titles in the pieces of music in an order corresponding to the head addresses of the pieces of music that are stored in the header region HE. Since the title of each of the pieces of music is displayed on both the TV set 60 and the liquid crystal display section 2, the code data includes code data for designating English alphanumeric characters, Japanese kana characters and Japanese kanji characters that are to be displayed on the TV set 60, and code data for designating English alphanumeric characters and Japanese katakana characters that are to be displayed on the liquid crystal display 2.

The performance data region ME stores data in MIDI format that is used for synthesizing sounds for the pieces of music. The data in the performance data region ME is stored in the order corresponding to the head addresses of the pieces of music that are stored in the header region HE.

Figure 5:
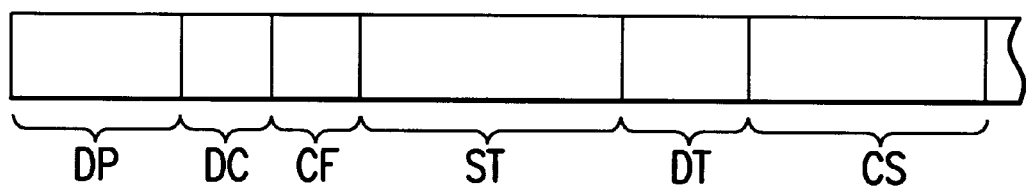
FIG. 5 shows a data format for performance data that is used in the musical score display apparatus as shown in FIG. 1.

The score data region CE stores score data to be displayed on the TV set 60 for each of the pieces of music in the order corresponding to the head addresses of the pieces of music are stored in the header region HE. As shown in FIG. 5, the score data includes a series of display position data DP, display color data DC, displayed color change indication data CF, character set data ST for displaying score information, display time data DT and color change sequence data CS. It is noted that the color change sequence data is included only when the color of the displayed characters or marks is changed.

The character set data ST includes beat marks, dynamic marks including mf (mezzo forte), f (forte), ff (fortissimo), etc., and area display marks indicating areas corresponding to patterns of the pieces of music (alphabets, such as A, B and C in accordance with this embodiment). The beat marks are displayed in synchronism with the beat of the piece of music to help a user keep pace with the tempo of the karaoke performance. In accordance with an embodiment of the present invention, the beat marks are presented by a plurality of round dots. However, in alternative embodiments, the beat mark can be in any one of different shapes. For example, the beat mark can be in the form of a triangle, a rectangle and the like. Furthermore, if a user wants to use a particular shape that is not provided in the character set data ST, additional data can be stored. In other words, new image data for the desired shape can be formed, and a code corresponding to the image data is defined.

The display position data DP is data for indicating a position of the characters displayed on the TV monitor 60. The display position data DP is expressed, for example, by coordinates with respect to the left upper corner of the TV monitor 60. The display color data DC is used for designating color of the characters to be displayed on the TV monitor 60.

The displayed color change indication data CF is a flag that indicates whether or not the color of the displayed character set ST should be changed. In accordance with an embodiment of the present invention, a flag is set only for the beat marks indicating that "color change is required", and another flag is set for all the other character sets indicating that "no color change is required". The display time data DT indicates a time duration for displaying the character set ST on the TV monitor 60, and is defined by a time duration from the start to the end of displaying the character set ST.

Furthermore, the color change sequence data CS indicates a speed of changing the color of the displayed character set or a variation of the speed. For example, a letter is divided by a predetermined width to define the number of unit widths, each being representative of a length Δx whose color is changed, and a time for changing the color of the length Δx is defined by Δt. The color change sequence data CS indicates a speed of changing color or a variation of the speed, and is composed of a sequence of the length Δx and the time Δt. In accordance with an embodiment of the present invention, the color of each of the beat marks is in the shape of a dot displayed on the TV monitor 60, and is changed as though the dot is wiped with a different color in a specified direction, for example, from left to right as viewed toward the TV monitor 60. It is noted that, in accordance with an embodiment of the present invention, the time for completely wiping off a beat mark is set at a quarter of a time represented by the beat mark (for example, one beat).

Next, operation of the score display apparatus in accordance with an embodiment of the present invention is described.

When the power switch 37 is turned on, the karaoke performance control circuit 72 accesses the addresses stored in the header region HE of the ROM cartridge 50, reads out title data to be displayed on the TV monitor 60 for a specified number of pieces of music, and sends character data corresponding to the title data to the video signal processing circuit 73. The video signal processing circuit 73 then displays the titles of the specified number of pieces of music on the TV monitor 60. One of the titles displayed on the TV monitor is highlighted by a cursor (not shown), and the highlighted title is displayed on the liquid crystal display section 2 in katakana characters.

As the user turns the selection knob 3, the cursor is moved to highlight a different title. By this operation, the user can selects a desired piece of music.

When the start/stop button 4 is depressed after selecting one of the pieces of music, the system control section 70 commands the karaoke performance control section 72 to start a performance. As a result, the karaoke performance control section 72 accesses the addresses stored in the header region HE of the ROM cartridge 50, reads out a starting address and an ending address of performance data of the selected piece of music, successively reads out performance data within an area defined by the starting address and the ending address to form accompaniment data, and transfers the accompaniment data to the audio signal processing circuit 75.

The karaoke performance control section 72 also reads out musical score data related to the piece of music (see FIG. 5) in synchronism with the operation of reading out the performance data described above, and generates image data corresponding to the content of the musical score data. In a more specific embodiment, the karaoke performance control section 72 interprets the musical score data shown in FIG. 5, and converts codes of character strings included in the musical score data into corresponding character data (or font data). The karaoke performance control section 72 then generates image data representative of the character data so that the image data is presented at a designated location, in a designated color and for a designated period of time. When the color of the image data is to be changed, the karaoke performance control section 72 changes the colors according to a specified sequence of colors. The image data is then transferred to the image video signal processing circuit 73. As a result, the video signal processing circuit 73 displays the musical score data associated with the piece of music being performed.

Figure 6:
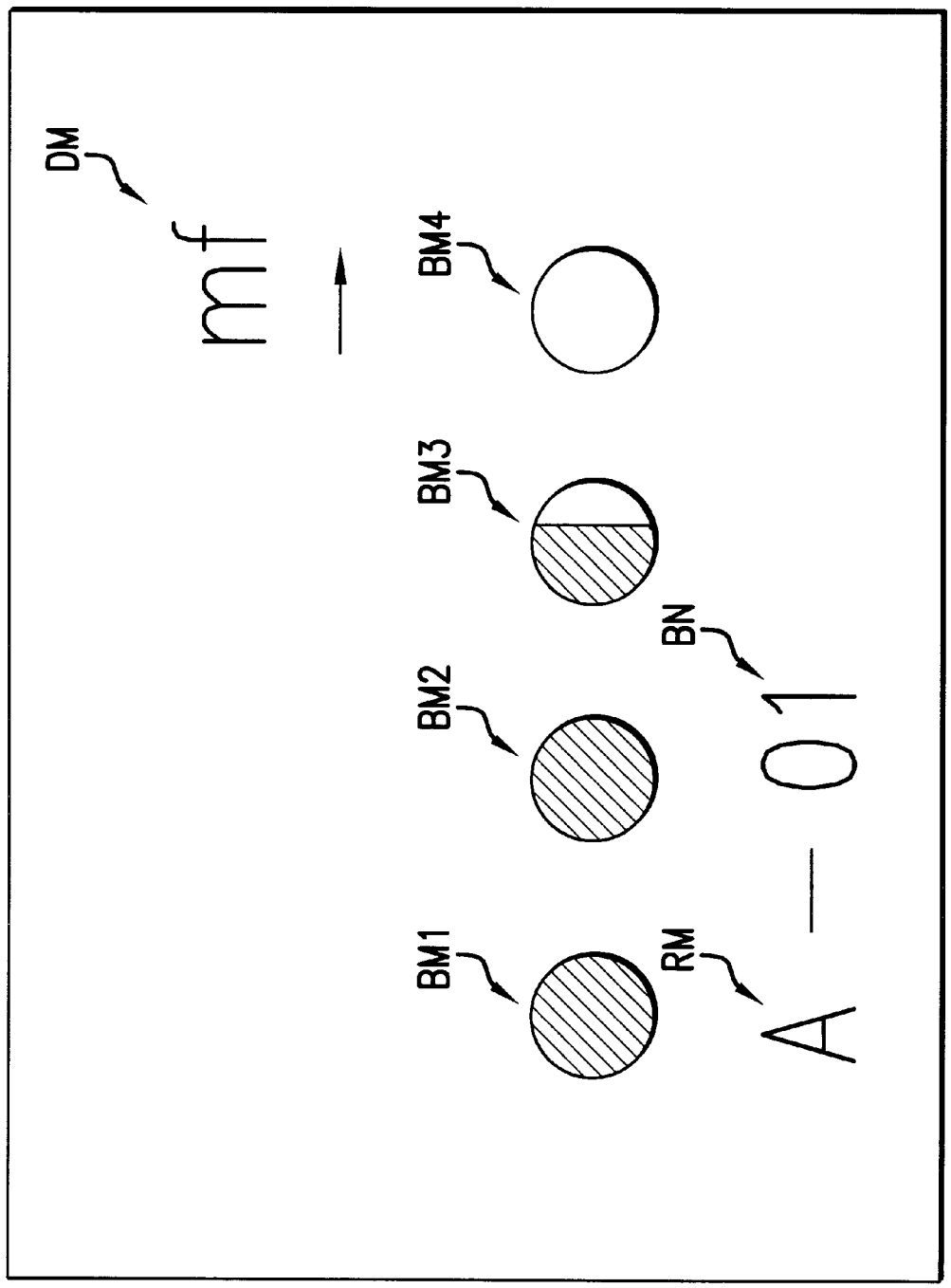
FIG. 6 shows an image displayed on a monitor of the TV apparatus to be used with the musical score display apparatus as shown in FIG. 1.

FIG. 6 shows an image displayed on the monitor of the TV set 60 during the performance in accordance with an embodiment of the present invention. When a piece of music in a four-part time is performed, four beat marks BM1–BM4 are shown on the monitor of the TV set 60, as shown in FIG. 6. The number of the beat marks BM1–BM4 (i.e., four beat marks) corresponds to the number of beats in each measure of the piece of music in a four-part time. In the illustrated embodiment, the beat marks BM1–BM4 are generally horizontally aligned about the center of the monitor of the TV set 60, as shown in FIG. 6. Each of the beat marks corresponds to each of the beats, and the color of each of the beat marks is changed in synchronism with the timing of each beat as though the beat mark is swept from left to right with a different color. In the illustrated embodiment shown in FIG. 6, the color of the third beat mark corresponding to the third beat is being changed. It should be appreciated that the image layout on the TV monitor is not limited to the one shown in FIG. 6. The display position data DP can be modified depending on preference to display an image in a different image display layout.

It is noted that, in accordance with embodiments of the present invention, a specified meter is typically presented by beat marks in a number corresponding to the number of beats in each measure of the specified meter. For example, three beat marks are shown in case of a three-part time and two beat marks are shown in case of a two-part time. However, when the tempo of a piece of music is very fast, and thus the time for changing the color during each beat is very short, two beats may be shown by one beat mark, or three beats may be shown by one beat mark. In another embodiment, for a piece of music in a six-part time, each three beats can be shown by one beat mark so that two beat marks are shown on the TV monitor.

Change of the color of the beat mark BM4 at the fourth beat shown in FIG. 6 is completed simultaneously at the end of each measure. As the next measure starts, a new set of four beat marks BM1–BM4 is displayed in a first color, and the color of each of the beat marks is then changed to a different color during each corresponding one of the beats. In this manner, a set of four beat marks BM1–BM4 is displayed at each measure, and the color of the beat marks is repeatedly changed in synchronism with a specified tempo and a specified beat timing of a piece of music.

In operation, a user watches the changing color of the beat marks on the TV monitor to play a musical instrument along with the accompaniment performed by the musical instrument karaoke apparatus. Thus, the user's performance can keep pace with the tempo of the accompaniment performed by the musical instrument karaoke apparatus.

A dynamic mark DM that indicates the degree of loudness may be shown over each of the beat marks BM1–BM4 shown in FIG. 6. In the illustrated embodiment, a dynamic mark "mf" representing "mezzo forte" is shown over the fourth beat mark BM 4. The dynamic mark DM typically indicates the degree of loudness of a beat corresponding to the beat mark shown immediately below the mark DM on the TV monitor 60. However, as shown in FIG. 6, an arrow "→" may be displayed below the dynamic mark DM, and immediately before the degree of loudness is changed. The arrow indicates that the dynamic mark DM shown over the arrow represents the degree of loudness starting with the first beat of the next measure. Therefore, in the illustrated embodiment, the dynamic mark "mf" does not indicate the degree of loudness of the fourth beat BM4 in the current measure, but instead indicates the degree of loudness of the first beat in the next measure.

As a result, a user can recognize designated degrees of loudness corresponding to specified beats by watching the TV monitor 60, as well as a degree of loudness of the first beat in the next measure immediately before the degree of loudness is designated to be changed.

At the lower left side of the monitor shown in FIG. 6, a range indication mark RM and a number BN representing one of a sequence of measures within the range RM are shown with a hyphen placed between them. A piece of music may be divided into a plurality of ranges, and the ranges may be represented by, for example, alphabetic characters, A, B, C, and the like. In the illustrated embodiment, a representation of "A-01" indicates that current performance is in the first measure in a range "A". Each time the performance advances by one measure, the sequence number BN is incremented. Also, when the range is changed, the range indication mark RM is changed, for example, from "A" to "B", "B" to "C" and the like. These marks allow a user to recognize a range in which she is currently playing (in other words, what music pattern she should play with) by watching the TV monitor 60. The user can also recognize at glance which one of the measures in the range she is playing.

In accordance with embodiments of the present invention, beat marks in a number corresponding to the number of beats in a unit of a measure are displayed during a performance of a musical instrument karaoke apparatus. The color of each of the beat marks is changed in synchronism with the tempo of the performance of the musical instrument karaoke apparatus such that each of the beat marks is wiped with a different color from left to right. As a result, a user, who plays a musical instrument with a karaoke accompaniment, can keep pace with the tempo of the karaoke accompaniment by watching the beat marks.

Further, dynamic marks currently designated are displayed as score information, and changes in the dynamic marks are displayed in advance of the change. Accordingly, the user can readily follow the progress of the music. Further, ranges and measures in each of the ranges are readily recognized, such that delicate score information can be recognized at a glance.

In the above described embodiment, the color of each beat mark is gradually changed as though the beat mark is wiped with a different color from left to right. The color may be changed in different manners depending on preference. Also, when the color of the marks is changed as though the marks are swept with a different color, the color change sequence data CS may be modified to provide variations in the color change. For example, the speed of wiping the beat marks is changed depending on locations of the beat marks, or the direction of wiping is changed.

Moreover, the displayed score information is not limited to the ones described above. Additional character data may be formed according to specific requirements, and marks and characters relating to other performance methods including, "fermata", tempo marks such as "a tempo", repeat marks, and the like may also be displayed. Further, a musical score may be displayed. In this case, for example, a musical score is divided into a plurality of sections, and the sections are successively displayed in synchronism with the performance of a piece of music. Also, the data format of score information is not limited to the one shown in FIG. 5, but other data formats suitable for displaying musical scores in a specific manners may be used.

The above embodiment is described with reference to a hand-carry type karaoke apparatus. However, the present invention is also applicable to other types of karaoke apparatuses, such as, for example, a karaoke apparatus installed in a typical karaoke restaurant or a karaoke bar.

In accordance with another embodiment of the present invention, a player does not have to look for a particular portion in a musical score to find score information of that particular portion. Instead, the player can obtain such score information at a glance, and thus can concentrate more on her own performance.

Furthermore, since the color of each of the beat marks is gradually changed in a predetermined period of time in synchronism with the tempo of the piece of music, it is easier for a performer to measure the timing of beats and thus to keep pace with the tempo of the accompaniment performed by the musical instrument karaoke apparatus.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A score information display apparatus for displaying data to assist a user in performing a musical instrument in synchronism with an accompaniment performance performed by a musical instrument karaoke apparatus, the score information display apparatus comprising:
    a memory device that stores character data corresponding to beat marks representative of beats of a piece of music;
    a reading device that reads out the character data from the memory device in synchronism with a tempo of the performance of the musical instrument karaoke apparatus;
    a display device that displays the beat marks in a number corresponding to the beats in a unit of at least a measure of the musical piece based on the character data read out by the reading device; and
    a color change control device that successively changes colors of the beat marks displayed by the display device in synchronism with a timing of the beats.

2. A score information display apparatus according to claim 1, wherein the color change control device changes color of each of the beat marks in a predetermined period of time.

3. A score information display apparatus according to claim 2, wherein each of the beat marks has a first color and defines one side and an opposite side, and wherein the color change control device successively changes the first color into a second color from the one side to the opposite side of each of the beat marks.

4. A score information display apparatus according to claim 3, wherein each of the beat marks is divided into a plurality of areas, and wherein the color change control device successively changes the first color of the plurality of areas into the second color one by one from the one side to the opposite side of each of the beat marks.

5. A score information display apparatus for displaying data to assist a user in performing a musical instrument in synchronism with an accompaniment performed by a musical instrument karaoke apparatus, the score information display apparatus comprising:
    a first memory region that stores first character data corresponding to beat marks representative of beats of a piece of music;
    a second memory region that stores second character data representative of marks for designating a method of performing the piece of music;
    a reading device that reads out the first character data from the first memory region in synchronism with a tempo of the performance of the musical instrument karaoke apparatus;
    a display device that processes the first character data read out by the reading device to display the beat marks in a number corresponding to the beats in a unit of at least a measure of the musical piece based on the first character data read out by the reading device; and
    a color change control device that successively changes color of the beat marks displayed by the display device in synchronism with a timing of the beats, wherein
        the reading device reads out second character data from the second memory region at a predetermined timing corresponding to the performance of the musical instrument karaoke apparatus, and
        the display device processes the second character data to display at least one of the marks for designating a method of performing the piece of music for a predetermined duration of time based on the second character data.

6. A score information display apparatus according to claim 5, wherein the color change control device changes color of each of the beat marks in a predetermined period of time.

7. A score information display apparatus according to claim 6, wherein each of the beat marks has a first color and defines one side and an opposite side, and wherein the color change control device successively changes the first color into a second color from the one side to the opposite side of each of the beat marks.

8. A score information display apparatus according to claim 7, wherein each of the beat marks is divided into a plurality of areas, and wherein the color change control device successively changes the first color of the plurality of areas into the second color one by one from the one side to the opposite side of each of the beat marks.

9. A method of displaying data to assist a user in performing a musical instrument in synchronism with an accompaniment performance performed by a musical instrument karaoke apparatus, the method comprising the steps of:
    storing character data in a memory region, the character data corresponding to beat marks representative of beats of a piece of music;
    reading out the character data from the memory region in synchronism with a tempo of the performance of the musical instrument karaoke apparatus;
    displaying the beat marks in a number corresponding to the beats in a unit of at least a measure of the musical piece based on the character data read out; and
    successively changing color of the beat marks displayed in synchronism with a timing of the beats.

10. A method according to claim 9, wherein the color of each of the beat marks is changed in a predetermined period of time.

11. A method according to claim 10, wherein the color of each of the beat marks is changed in a period of time corresponding to a quarter of a length of time represented by each of the beats of the piece of music.

12. A method according to claim 9, wherein each of the beat marks has a first color and defines one side and an opposite side, and wherein the first color is successively changed into a second color from the one side to the opposite side of each of the beat marks.

13. A method according to claim 9, wherein the beat marks are changed from a first color to a second color, wherein each of the beat marks is divided into a plurality of areas, and wherein the first color of the plurality of areas is successively changed into the second color one area by one area from one side to the opposite side of each of the beat marks.

14. A method for displaying data to assist a user in performing a musical instrument in synchronism with an accompaniment performed by a musical instrument karaoke apparatus, the method comprising the steps of:

storing first character data corresponding to beat marks representative of beats of a piece of music in a first memory region;

storing second character data representative of marks for designating a method of performing the piece of music in a second memory region;

reading out the first character data from the first memory region in synchronism with a tempo of the performance of the musical instrument karaoke apparatus;

displaying the beat marks in a number corresponding to the beats in a unit of at least a measure of the musical piece based on the first character data read out;

successively changing color of the beat marks displayed in a specified direction in synchronism with a timing of the beats;

reading out second character data from the second memory region at a predetermined timing corresponding to the performance of the musical instrument karaoke apparatus; and displaying at least one of the marks for designating a method of the performance for a predetermined duration of time based on the second character data read out.

15. A method according to claim 14, wherein the color of each of the beat marks is changed in a predetermined period of time.

16. A method according to claim 14, wherein each of the beat marks has a first color and defines one side and an opposite side, and wherein the first color is changed into a second color from the one side to the opposite side of each of the beat marks.

17. A method according to claim 16, wherein each of the beat marks is divided into a plurality of areas, and wherein the first color of the plurality of areas is successively changed into the second color one by one from the one side to the opposite side of each of the beat marks.

18. A method according to claim 14, wherein the beat marks and the at least one of the marks for designating a method of the performance are displayed on a monitor.

* * * * *